US011682388B2

(12) United States Patent
Kim et al.

(10) Patent No.: US 11,682,388 B2
(45) Date of Patent: Jun. 20, 2023

(54) ARTIFICIAL INTELLIGENCE APPARATUS FOR RECOGNIZING SPEECH INCLUDING MULTIPLE LANGUAGES, AND METHOD FOR THE SAME

(71) Applicant: LG ELECTRONICS INC., Seoul (KR)

(72) Inventors: Yejin Kim, Seoul (KR); Hyun Yu, Seoul (KR); Jonghoon Chae, Seoul (KR)

(73) Assignee: LG ELECTRONICS INC, Seoul (KR)

( * ) Notice: Subject to any disclaimer, the term of this patent is extended or adjusted under 35 U.S.C. 154(b) by 0 days.

(21) Appl. No.: 17/831,371

(22) Filed: Jun. 2, 2022

(65) Prior Publication Data
US 2022/0293095 A1 Sep. 15, 2022

Related U.S. Application Data

(63) Continuation of application No. 16/812,172, filed on Mar. 6, 2020, now Pat. No. 11,380,311.

(30) Foreign Application Priority Data

Dec. 23, 2019 (KR) .......................... 10-2019-0173315

(51) Int. Cl.
*G10L 15/00* (2013.01)
*G10L 15/30* (2013.01)
(Continued)

(52) U.S. Cl.
CPC ............ *G10L 15/183* (2013.01); *G06N 3/047* (2023.01); *G06N 3/08* (2013.01); *G10L 15/005* (2013.01);
(Continued)

(58) Field of Classification Search
CPC ......... G10L 15/00; G10L 13/08; G10L 15/07; G10L 15/30
See application file for complete search history.

(56) References Cited

U.S. PATENT DOCUMENTS

| 6,141,642 | A | * | 10/2000 | Oh | .......................... G10L 13/08 704/277 |
| 6,182,026 | B1 | * | 1/2001 | Tillmann | ................ G06F 40/42 704/256.1 |
| 6,952,665 | B1 | * | 10/2005 | Shimomura | ............ G06F 40/58 715/236 |
| 2009/0070102 | A1 | * | 3/2009 | Maegawa | .............. G10L 15/183 704/277 |

(Continued)

FOREIGN PATENT DOCUMENTS

| DE | 112014006542 T5 * 12/2016 | ......... G01C 21/3608 |
| EP | 2821991 A1 * 1/2015 | ......... G01C 21/3664 |

(Continued)

OTHER PUBLICATIONS

U.S. Appl. No. 16/812,172, Office Action dated Aug. 13, 2021, 10 pages.

*Primary Examiner* — Shreyans A Patel
(74) *Attorney, Agent, or Firm* — Lee, Hong, Degerman, Kang & Waimey PC

(57) ABSTRACT

An AI apparatus includes a microphone to acquire speech data including multiple languages, and a processor to acquire text data corresponding to the speech data, determine a main language from languages included in the text data, acquire a translated text data obtained by translating a text data portion, which has a language other than the main language, in the main language, acquire a morpheme analysis result for the translated text data, extract a keyword for intention analysis from the morpheme analysis result, acquire an intention pattern matched to the keyword, and perform an operation corresponding to the intention pattern.

10 Claims, 8 Drawing Sheets

(51) Int. Cl.
| | |
|---|---|
| *G10L 13/08* | (2013.01) |
| *G10L 15/07* | (2013.01) |
| *G10L 15/183* | (2013.01) |
| *G10L 15/02* | (2006.01) |
| *G10L 15/22* | (2006.01) |
| *G10L 15/18* | (2013.01) |
| *G06N 3/08* | (2023.01) |
| *G10L 15/16* | (2006.01) |
| *G10L 15/14* | (2006.01) |
| *G06N 3/047* | (2023.01) |
| *G10L 15/08* | (2006.01) |

(52) U.S. Cl.
CPC ............ *G10L 15/02* (2013.01); *G10L 15/142* (2013.01); *G10L 15/16* (2013.01); *G10L 15/1815* (2013.01); *G10L 15/22* (2013.01); *G10L 2015/025* (2013.01); *G10L 2015/088* (2013.01)

(56) References Cited

U.S. PATENT DOCUMENTS

| | | | |
|---|---|---|---|
| 2010/0131262 A1* | 5/2010 | Gruhn | G10L 15/187 704/E15.001 |
| 2012/0035914 A1* | 2/2012 | Brun | G06F 40/263 704/9 |
| 2012/0316875 A1* | 12/2012 | Nyquist | G10L 15/30 704/235 |
| 2013/0080146 A1* | 3/2013 | Kato | G10L 15/005 704/2 |
| 2015/0012260 A1* | 1/2015 | Chakladar | G01C 21/3664 704/9 |
| 2017/0018272 A1* | 1/2017 | Lee | G06F 16/9535 |
| 2019/0332680 A1* | 10/2019 | Wang | G10L 15/07 |

FOREIGN PATENT DOCUMENTS

| | | | |
|---|---|---|---|
| JP | 2001117921 A | * | 4/2001 |
| WO | WO-2021100918 A1 | * | 5/2021 |

* cited by examiner

ARTIFICIAL INTELLIGENCE APPARATUS FOR RECOGNIZING SPEECH INCLUDING MULTIPLE LANGUAGES, AND METHOD FOR THE SAME

CROSS-REFERENCE TO RELATED APPLICATIONS

This application is a continuation of U.S. patent application Ser. No. 16/812,172, filed on Mar. 6, 2020, claims the benefit of earlier filing date and right of priority to Korean Patent Application No. 10-2019-0173315 filed on Dec. 23, 2019, the contents of which are all hereby incorporated by reference herein in their entirety.

BACKGROUND

The present disclosure relates to an artificial intelligence apparatus for recognizing a speech including multiple languages and making a response, and a method for the same. More particularly, the present disclosure relates to an artificial intelligence apparatus for detecting the intention in a main language of multiple languages included in a speech, and a method for the same.

Recently, devices, which receive sounds to perform a control operation, have been increased. A device, such as an artificial intelligence (AI) speaker or a smartphone, to provide a speech recognition function recognizes a speech uttered from a user, and performs a control operation corresponding to the recognition result, or makes a response.

With globalization, multiple languages are frequently included in the speech uttered from the user. However, since a speech recognition model processes the speech to be appropriate to each language while distinguishing between languages, a recognition rate for a sentence including multiple languages is low.

In addition, it is difficult for a speech command includes multiple languages to detect the intention of the speech command, so the speech command may not be understood.

SUMMARY

The present disclosure is to solve the above described problems or other problems.

The present disclosure is to provide an AI apparatus to recognize a speech including multiple languages and a method for the same.

The present disclosure is to an AI apparatus to solve a problem making it difficult to detect the whole intention of a speech when recognizing a speech including multiple languages in an individual language, and a method for the same.

The present disclosure is to an AI apparatus to solve a problem making it difficult to completely analyze the whole intention of a speech even if the intention of an individual language is extracted from a speech including multiple languages, and a method for the same.

According to an embodiment of the present disclosure,

According to an embodiment of the present disclosure,

As described above, according to an embodiment of the present disclosure, the speech including at least two languages may be recognized.

Further, according to an embodiment of the present disclosure, the main language may be detected from the multiple languages included in the speech and the whole intention of the speech may be completely analyzed in the main language.

In addition, according to an embodiment of the present disclosure, the whole intention may be analyzed in the speech including the multiple languages.

Further, according to an embodiment of the present disclosure, the failure possibility to the intention analysis may be reduced when the intention of each individual language is analyzed with respect to the speech including the multiple languages.

DETAILED DESCRIPTION OF THE EMBODIMENTS

Figure 1:
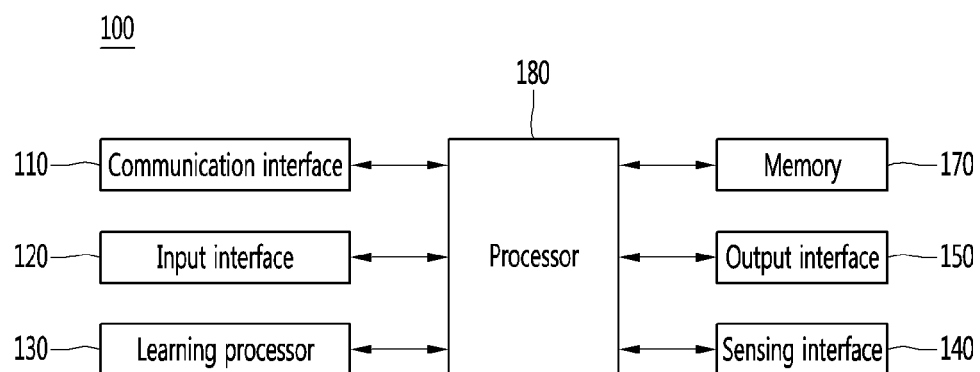
FIG. 1 illustrates an AI device according to an embodiment of the present disclosure.

Hereinafter, embodiments of the present disclosure are described in more detail with reference to accompanying drawings and regardless of the drawings, symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensing interface 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a learning data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing interface 140 may acquire at least one of internal information about the AI device 100, ambient environment information about the AI device 100, and user information by using various sensors.

Examples of the sensors included in the sensing interface 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display unit for outputting time information, a speaker for outputting auditory information, and a haptic module for outputting haptic information.

The memory 170 may store data that supports various functions of the AI device 100. For example, the memory 170 may store input data acquired by the input interface 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
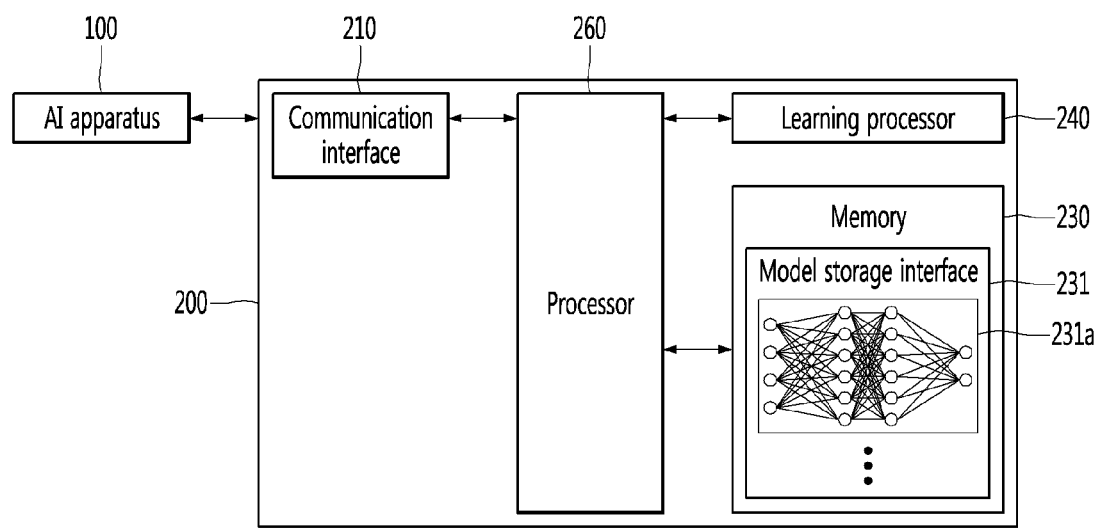
FIG. 2 illustrates an AI server according to an embodiment of the present disclosure.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 can transmit and receive data to and from an external device such as the AI device 100.

The memory 230 may include a model storage interface 231. The model storage interface 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
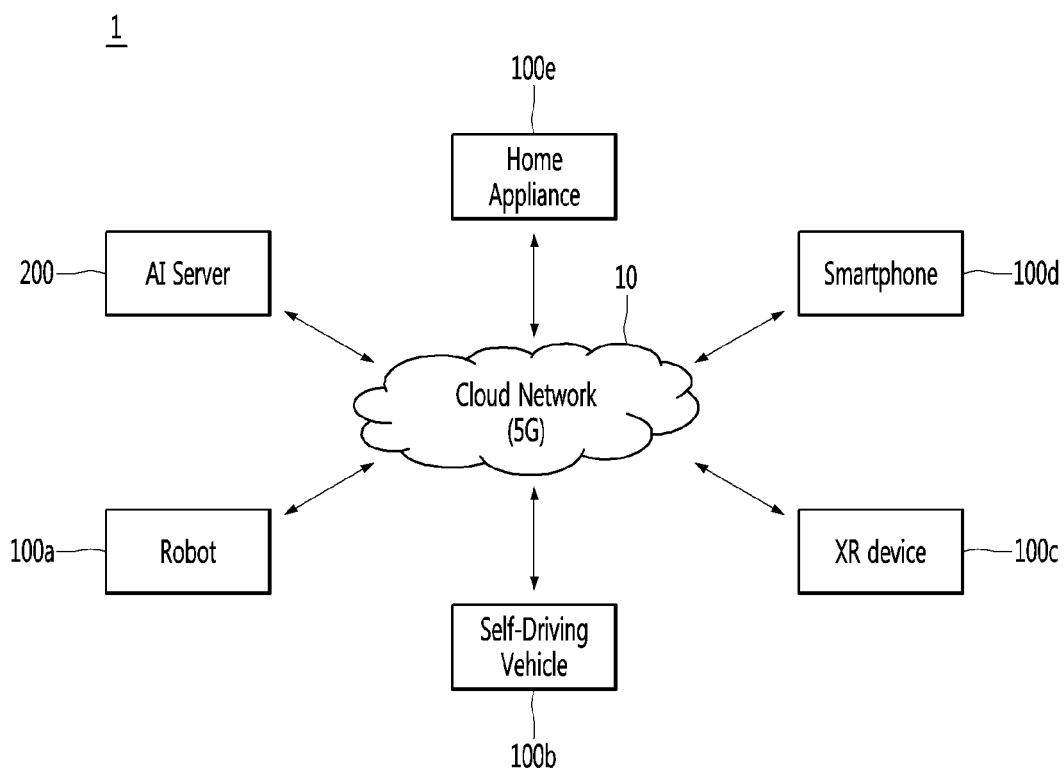
FIG. 3 illustrates an AI system according to an embodiment of the present disclosure.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
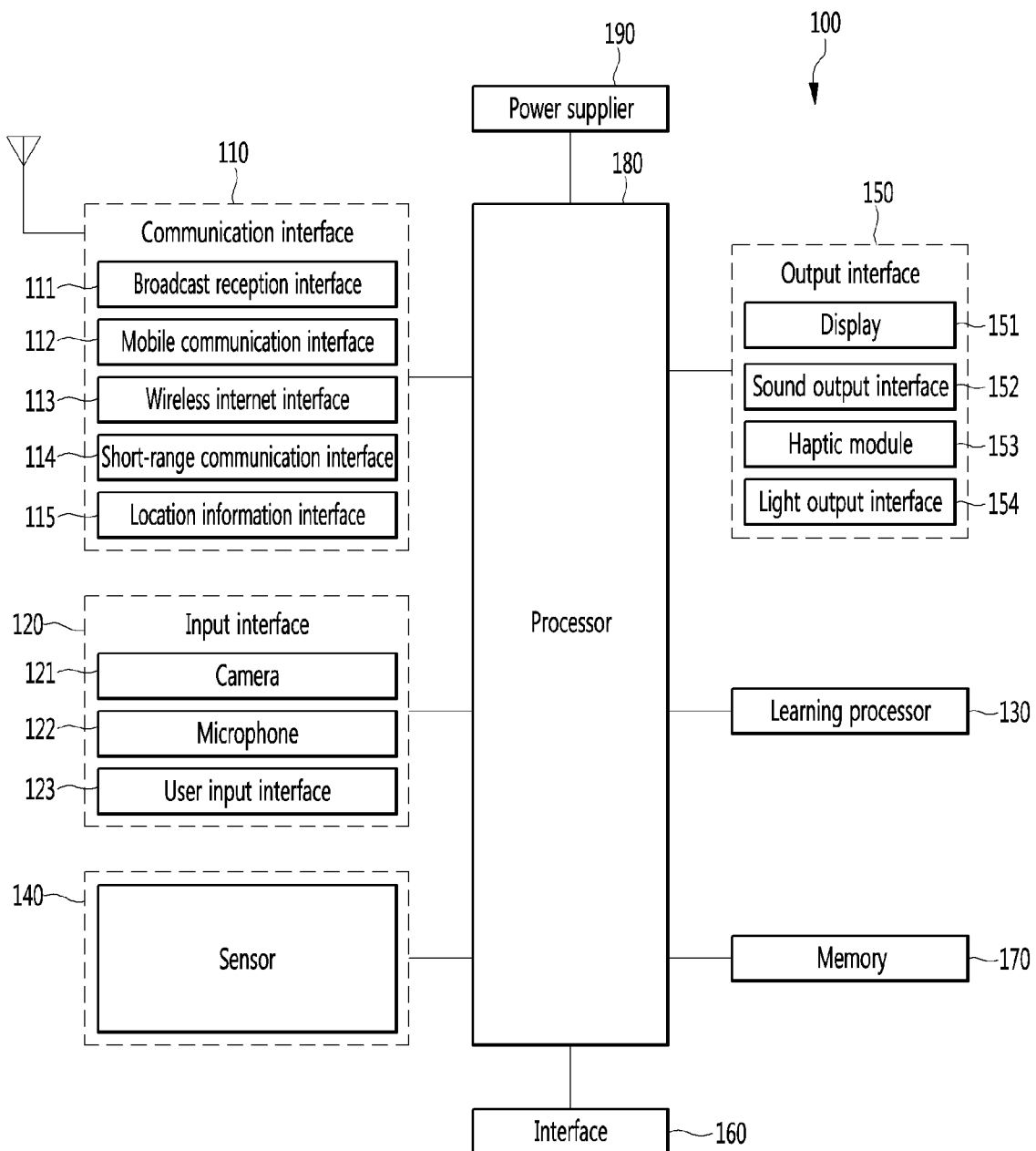
FIG. 4 is a block diagram illustrating an artificial intelligence device according to the present disclosure.

FIG. 4 is a block diagram illustrating an artificial intelligence device according to the present disclosure.

A description overlapping FIG. 1 will be omitted.

The communication interface 110 may include at least one of a broadcast reception interface 111, a mobile communication interface 112, a wireless Internet interface 113, a short-range communication interface 114 and a location information interface 115.

The broadcast reception interface 111 receives broadcast signals and/or broadcast associated information from an external broadcast management server through a broadcast channel.

The mobile communication interface 112 may transmit and/or receive wireless signals to and from at least one of a base station, an external terminal, a server, and the like over a mobile communication network established according to technical standards or communication methods for mobile communication (for example, Global System for Mobile Communication (GSM), Code Division Multi Access (CDMA), CDMA 2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless Internet interface 113 is configured to facilitate wireless Internet access. This module may be installed inside or outside the artificial intelligence device 100. The wireless Internet interface 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

The short-range communication interface 114 is configured to facilitate short-range communication and to support short-range communication using at least one of Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The location information interface 115 is generally configured to acquire the position (or the current position) of the mobile artificial intelligence device. Representative examples thereof include a Global Position System (GPS) module or a Wi-Fi module. As one example, when the artificial intelligence device uses a GPS module, the position of the mobile artificial intelligence device may be acquired using a signal sent from a GPS satellite.

The input interface 120 may include a camera 121 for receiving a video signal, a microphone 122 for receiving an audio signal, and a user input interface 123 for receiving information from a user.

The camera 121 may process image frames of still images or moving images obtained by image sensors in a video call more or an image capture mode. The processed image frames can be displayed on the display 151 or stored in memory 170.

The microphone 122 processes an external acoustic signal into electrical audio data. The processed audio data may be variously used according to function (application program) executed in the artificial intelligence device 100. Meanwhile, the microphone 122 may include various noise removal algorithms to remove noise generated in the process of receiving the external acoustic signal.

The user input interface 123 receives information from a user. When information is received through the user input interface 123, the processor 180 may control operation of the artificial intelligence device 100 in correspondence with the input information.

The user input interface 123 may include one or more of a mechanical input element (for example, a mechanical key, a button located on a front and/or rear surface or a side surface of the artificial intelligence device 100, a dome switch, a jog wheel, a jog switch, and the like) or a touch input element. As one example, the touch input element may be a virtual key, a soft key or a visual key, which is displayed on a touchscreen through software processing, or a touch key located at a location other than the touchscreen.

The output interface 150 is typically configured to output various types of information, such as audio, video, tactile output, and the like. The output interface 150 may include a display 151, an audio output module 152, a haptic module 153, and a light output interface 154.

The display 151 is generally configured to display (output) information processed in the artificial intelligence device 100. For example, the display 151 may display execution screen information of an application program executed by the artificial intelligence device 100 or user interface (UI) and graphical user interface (GUI) information according to the executed screen information.

The display 151 may have an inter-layered structure or an integrated structure with a touch sensor in order to realize a touchscreen. The touchscreen may provide an output interface between the artificial intelligence device 100 and a user, as well as function as the user input interface 123 which provides an input interface between the artificial intelligence device 100 and the user.

The audio output module 152 is generally configured to output audio data received from the wireless communication interface 110 or stored in the memory 170 in a call signal reception mode, a call mode, a record mode, a speech recognition mode, a broadcast reception mode, and the like.

The audio output module 152 may also include a receiver, a speaker, a buzzer, or the like.

A haptic module 153 can be configured to generate various tactile effects that a user feels. A typical example of a tactile effect generated by the haptic module 153 is vibration.

A light output interface 154 may output a signal for indicating event generation using light of a light source of the artificial intelligence device 100. Examples of events generated in the artificial intelligence device 100 may include message reception, call signal reception, a missed call, an alarm, a schedule notice, email reception, information reception through an application, and the like.

The interface 160 serves as an interface with external devices to be connected with the artificial intelligence device 100. The interface 160 may include wired or wireless headset ports, external power supply ports, wired or wireless data ports, memory card ports, ports for connecting a device having an identification module, audio input/output (I/O) ports, video I/O ports, earphone ports, or the like. The artificial intelligence device 100 may perform appropriate control related to the connected external device in correspondence with connection of the external device to the interface 160.

The identification module may be a chip that stores a variety of information for granting use authority of the artificial intelligence device 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the artificial intelligence device 100 via the interface 160.

The power supplier 190 receives external power or internal power and supplies the appropriate power required to operate respective components included in the artificial intelligence device 100, under control of the controller 180. The power supplier 190 may include a battery, and the battery may be a built-in or rechargeable battery.

Meanwhile, as described above, the processor 180 controls operation related to the application program and overall operation of the artificial intelligence device 100. For example, the processor 180 may execute or release a lock function for limiting input of a control command of the user to applications when the state of the mobile artificial intelligence device satisfies a set condition.

Figure 5:
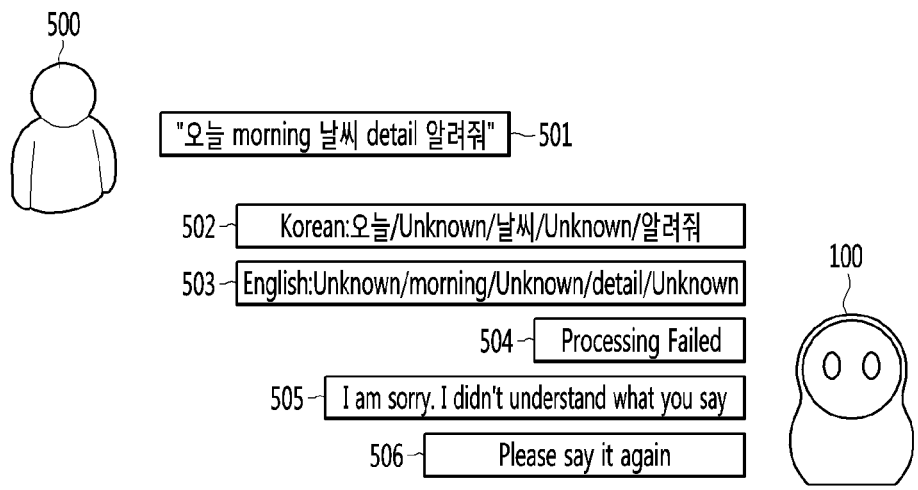
FIG. 5 is a view illustrating a problem occurring in the situation that a speech including multiple languages is input.

FIG. 5 is a view illustrating a problem occurring in the situation that a speech including multiple languages is input.

The AI apparatus 100 may acquire a speech of "오늘 morning 날씨 detail 알려줘" 501 uttered from a user 500 (means "Let me know the weather details this morning" in English). In this case, the speech "오늘 morning 날씨 detail 알려줘" 501, which is uttered from the user 500, includes a Korean portion of '오늘' (means "today" in English), a Korean text of '날씨' (means 'weather' in English), a Korean portion of "알려줘" (refers to 'let me know' in English), and an English portion of 'morning' and 'detail'.

When the AI apparatus 100 performs natural language understanding processing in Korean with respect to the speech 501 uttered from the user 500, English portions of 'morning' and 'detail' may not be subject to natural language processing (see reference numeral 502). Alternatively, when the AI apparatus 100 performs natural language understanding processing in English, Korean portions of '오늘' (means "today" in English), '날씨' (means 'weather' in English), and "알려줘" (means 'let me know' in English) may not be subject to natural language processing (see reference numeral 503). Accordingly, natural language understanding processing of the AI apparatus 100 may be failed (see reference numeral 504).

In this case, the AI apparatus 100 says, "I am Sorry. I didn't understand what you say" (see reference number 505) or "Please say it again" (see reference numeral. 506).

Figure 6:
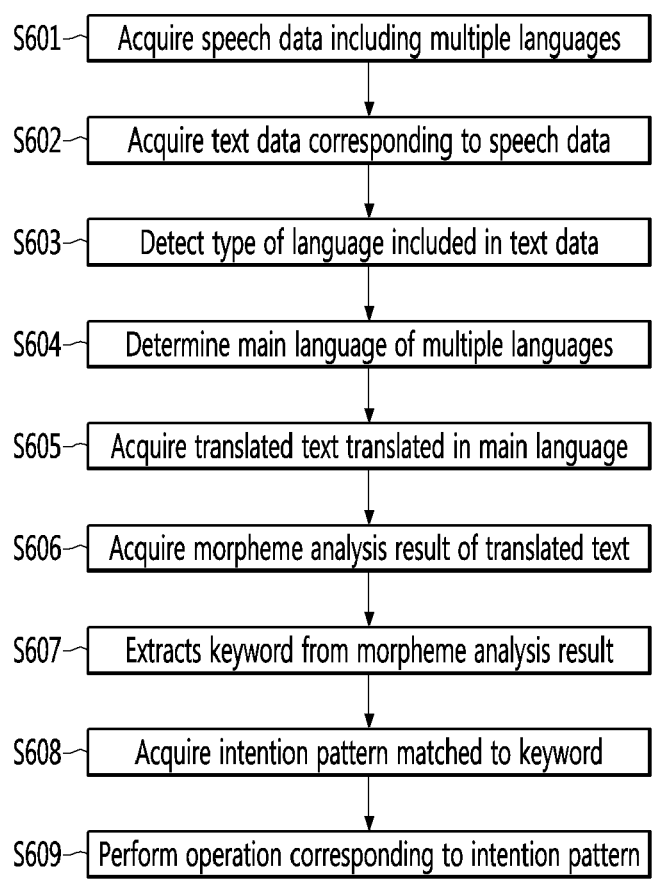
FIG. 6 is a flowchart illustrating a method for recognizing a speech according to an embodiment of the present disclosure.

FIG. 6 is a flowchart illustrating a method for recognizing a speech according to an embodiment of the present disclosure.

The microphone 122 may acquire speech data including multiple languages (S601).

The communication interface 110 may receive, from a user device, the speech data including the multiple languages, which is input from the user through a speech input module of the user device (not illustrated).

In addition, the processor 180 may acquire speech data including the multiple languages through the microphone 122 or the communication interface 110.

The speech data including the multiple languages may be speech data, such as "오늘 morning 날씨 detail 알려줘"

(means "Let me know the weather details this morning" in English), uttered from the user as the user speaks multiple languages.

In addition, the speech data including multiple languages may include speech data formed in double languages including a first language and a second language which are different from each other. The processor 180 may acquire speech data including a double language including the first language and the second language through the microphone 122 or the communication interface 110.

Meanwhile, the processor 180 may acquire text data corresponding to the speech data from the speech data (S602).

The processor 180 may generate the text data corresponding to the voice data from the voice data using a speech to text (STT) engine for converting the voice input into a string. In addition, the processor 180 may transmit the voice data to an external STT server (not shown) including an STT engine through the communication interface 110, and receive text data converted by the STT server through the communication interface 110.

In addition, the STT engine may generate text data for each of the multiple languages included in the speech data.

For example, each of the multiple languages may be recognized with respect to the speech of "오늘 morning 날씨 detail 알려줘" uttered from a user (means "Let me know the weather details this morning" in English), and thus the text data, which is "오늘 morning 날씨 detail 알려줘" uttered from a user (means "Let me know the weather details this morning" in English), corresponding to the speech may be acquired.

Meanwhile, the processor 180 may detect the type of a language included in the text data (S603)

The processor 180 may detect the language included in the text data.

In addition, the processor 180 may detect the type of a language for each character or word included in the text data, and output the type of the language type for the character or word.

The processor 180 may tokenize text data in the unit of a meaningful character string and may acquire each of the tokenized text data portions. In this case, the meaningful string unit may include the character or word unit.

The processor 180 may detect a language for each tokenized text data.

Figure 7:
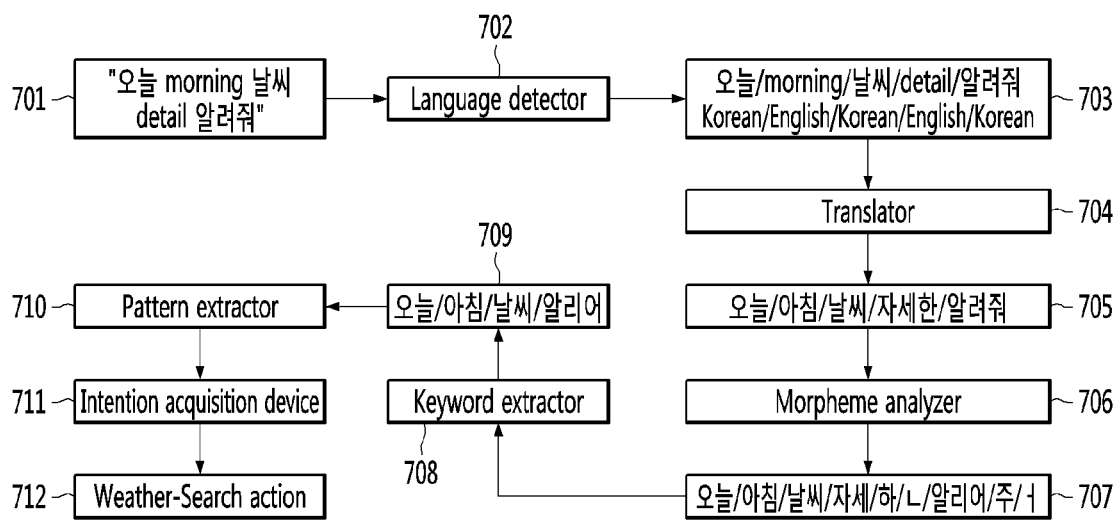
FIG. 7 is a view illustrating the procedure for recognizing a speech according to an embodiment of the present disclosure.

Referring to FIG. 7, the processor 180 may use a language detector 702 which detects whether multiple languages are included in the text data and outputs the detected type of the language.

Meanwhile, each module illustrated in FIG. 7 may be included in the processor 180. In addition, each module illustrated in FIG. 7 may be positioned in the AI apparatus 100 or the AI server 200, and may be controlled by the processor 180. In addition, the structure and the functions of modules illustrated in FIG. 7 may be operated and performed by the processor 180.

The language detector 702 may use a hidden Markov model (HMM) to determine the type of the language included in text data including multiple languages.

The processor 180 may detect a relevant language with respect to the tokenized text data using the HMM.

The HMM, which is one of the statistical Markov Models, regards a system as including two elements in a hidden state and an observed state. The hidden Markov model may be a model based on the Markov chain. The Markov chain may refer to discrete probability processes with Markov properties.

Figure 8:
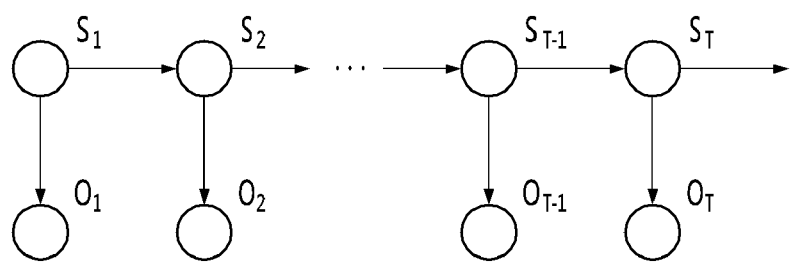
FIG. 8 is a view illustrating the procedure of detecting a language according to an embodiment of the present disclosure.

FIG. 8 is a view illustrating the procedure of detecting a language according to an embodiment of the present disclosure.

Referring to FIG. 8, the processor 180 may tag the type of a language for each characteristic or word using the HMM For example, the processor 180 may acquire the types of languages (S1, S2, . . . ST−1, and ST) by performing the HMM with respect to T-number tokenized text data (for example, text data (O1, O2, . . . OT−1, or OT) for each character or word) included in the text data. In this case, 'O' may refer to an observation result, and 'S' may refer to a hidden state.

The processor 180 may acquire the probability of each type of a language with respect to each of the T tokenized text data included in the text data through Equation 1

$$p(S_1, \ldots, S_T, O_1, \ldots, O_T) = \prod_{t=1}^{T} p(O_t \mid S_t) \prod_{t=1}^{T} p(S_t \mid S_{t-1})$$ [Equation 1]

In addition, the processor 180 may search for an optimal path of the hidden state to determine the type of the language using Viterbi decoding, and Equation 2 may be used.

$$\max_{\{S_t\}_{t=1}^{T}} p(\{S_t\}_{t=1}^{T}, \{O_t\}_{t=1}^{T}) = \max_{k} V_T^k$$ [Equation 2]

The language detector 702 may detect the type of a language for each character or word included in the text data by using the HMM and may output the type of the language for each character or word.

For example, referring to FIG. 7, the language detector 701 may output data obtained by tagging "Korean" on "오늘 (means 'today' in English)", "날씨 (means 'weather' in English)" "알려줘 (means 'let me know' in English)" and tagging "English" on "morning' and 'detail' in "오늘 morning 날씨 detail 알려줘 500 (means "Let me know the weather details this morning" in English)"

Meanwhile, the processor 180 may determine a main language of multiple languages included in the text data (S604).

The main language may refer to a language which is mainly used by the speaker such that the speaker expresses the intention of the speaker. Therefore, the processor 180 may detect the intention of the speech based on the main language included in the speech of the speaker, thereby exactly performing the intention analysis on the entire speech.

The processor 180 may determine, as the main language, the highest frequently sensed language from languages detected for the tokenized text data.

In addition, the processor 180 may determine, as the main language, the language tagged with the highest frequency for each character or word.

For example, referring to FIG. 7, since Korean is tagged three times and English is tagged twice with respect to the words, the processor 180 may determine, as the main language, the highest frequently tagged Korean.

In addition, the processor 180 may determine the language first tagged in the text data, as the main language.

For example, referring to FIG. 7, since the speaker first starts speaking in Korean, the processor 180 may determine the first tagged Korean as the main language.

Meanwhile, the processor 180 may acquire the translated text translated in the main language (S605).

The processor 180 may acquire translation text data by translating text data having a language other than the main language, in the main language.

Referring to FIG. 7, the processor 180 may use a translator 704 which translates a text for each language in a predetermined language.

The translator 704 may include an artificial neural network (ANN) used in machining learning to receive a text formed in a specific language and to output a text acquired by translating the received text in a specific language.

The ANN includes artificial neurons (node) constituting a network through the combination of synapses. The ANN may be defined by a connection pattern between neurons at different layers, a learning process of updating model parameters, and an activation function of generating an output value.

Referring to FIG. 7, the translator 702 may determine the main language as Korean, and may translate 'morning' and 'detail', which is not the main language, in Korean which is the main language.

The translator 704 may output the translated text '오늘/아침/날씨 /자세한/알려줘' (which refers to 'today/morning/weather/detail/let me know' in English) (see reference numeral 705).

Accordingly, since the processor 180 may analyze the intention using the translated text based on the main language, the whole intention of the speech may be exactly analyzed.

Meanwhile, the processor 180 may acquire a morpheme analysis result of the translated text (S606)

The processor 180 may acquire the morpheme analysis result for the translated text, which is performed based on a translating language through a morpheme analyzer 706.

The processor 180 may acquire text data acquired by dividing the translated text data in unit of a morpheme.

The morpheme analyzer 706 may extract morphemes and various linguistic attributes (roots, prefixes, suffixes, or parts of speech) included in the text according to languages, and may output the extraction result.

For example, the morpheme analyzer 706 receives the text of '오늘/아침/날씨 /자세한/알려줘' ('today/morning/weather/detail/let me know/' in English), which is translated in Korean, and may output a text of '오늘/아침/날씨/자세/하 /ㄴ/알리어/주/어 ' ('today/morning/weather/detail/Korean letter/Korean letter/let me know/Korean letter/Korean letter' in English 707) tagged and divided according to morphemes based on Korean.

The processor 180 may acquire a morpheme analysis result including a text divided according to morphemes through the morpheme analyzer 706.

Therefore, when the processor 180 extracts a keyword from the morpheme analysis result thereafter, the processor 180 may determine whether each text acquired through the division according to the morpheme corresponds to the keyword, and may extract the keyword, thereby extracting extract and concise keywords.

Meanwhile, the processor 180 may extract the keyword from the morpheme analysis result (S607).

The processor 180 may extract keywords necessary to identify the intention of the speech from the morpheme analysis result by using a keyword extractor 708. When the intention of the speech is determined based on the translated text, texts unnecessary for the translated text may be mixed. However, since the processor 180 may determine the intention of the speech by extracting only a keyword from the text acquired through the division according to the morpheme, the processor 180 may exactly analyze the intention of the speech.

The keyword extractor 708 may receive each of text data acquired through the division according to morphemes, and output a keyword to be a basis to determine the intention of the speech with respect to each of the text acquired through the division according to morphemes.

The processor 180 may input the text data, which is acquired through the division in morpheme unit, into the keyword extraction model, and may acquire a keyword output from the keyword extraction model.

The keyword extraction model may be an artificial neural network (ANN) model trained to output a specific keyword, which is necessary for detecting the intention of the speech, from the text data obtained through division in a specific morpheme unit.

The keyword extraction model includes artificial neurons (node) constituting a network through the combination of synapses. The keyword extraction model may be defined by a connection pattern between neurons at different layers, a learning process of updating model parameters, and an activation function of generating an output value.

The keyword extraction model may be a model trained in a recurrent neural network (RNN) algorithm in which the text data divided in each morpheme unit is output and each keyword is output in a sequence unit. The keyword extraction model may employ a long short-term memory (LSTM) network to solve the problem of long term dependencies and an attention mechanism to compensate for reducing the accuracy of the output data in the sequence unit as input data in the sequence unit is increased.

Figure 9:
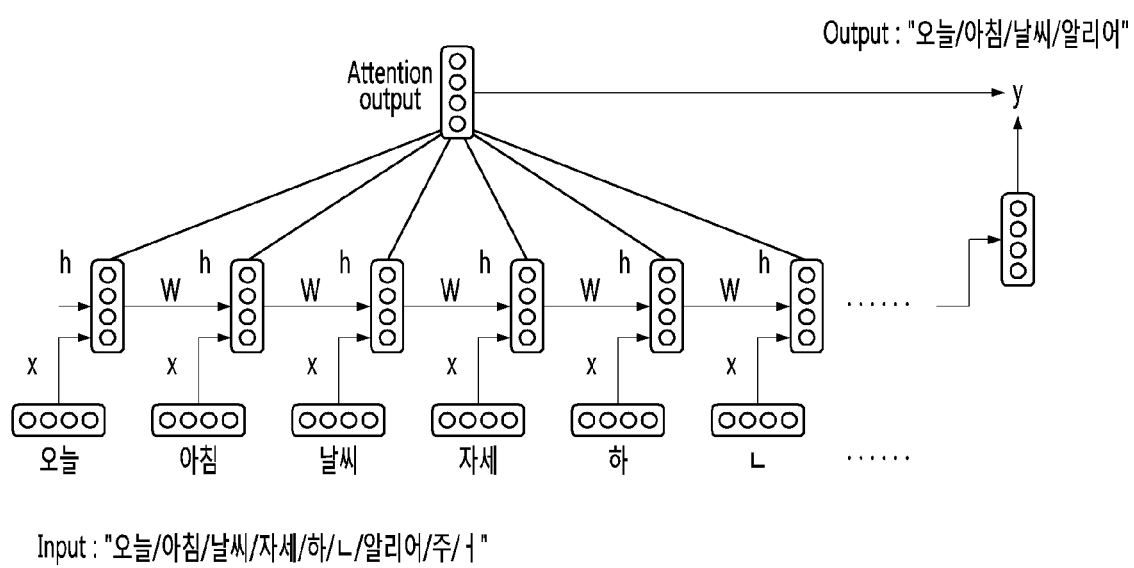
FIG. 9 is a view illustrating the procedure of acquiring a keyword according to an embodiment of the present disclosure.

Referring to FIG. 9, the keyword extraction model may sequentially receive, as input data, 오늘/아침/날씨/자 세/하/ㄴ/알리어/주/어 " (which refers to 'today/morning/weather/detail/Korean letter/Korean letter/let me know/Korean letter/Korean letter' in English). The keyword extraction model may output " 오늘/아침/날씨/알리어 " (refers to 'today/morning/weather/let me know' in English), which is a keyword, based on the determination of the intention of the speech.

Meanwhile, the processor 180 may acquire the intention pattern matched to a keyword (S608).

The intention pattern may refer to patterned intention information that may be commonly extracted from various speech data. For example, a user may utter various speeches, such as weather search, contact search, outgoing call, message transmission, and application execution, by using the speech recognition system of the AI apparatus 100, and the intention pattern may refer to intention information that may be commonly extracted from various voices For example, the intention pattern may be one of a list of intention patterns such as 'music/search' and 'today/morning/weather/search'.

The intention pattern list may be stored in the intention pattern database.

Meanwhile, the user may utter a significantly large number of speeches, and the large number of combinations of keywords may be extracted from the speeches, but the number of the intention pattern list may be limited.

Accordingly, the processor 180 may generate a normalized pattern that may increase the matching possibility to the intention pattern by normalizing the keyword.

The processor 180 may use a pattern extractor 710 to generate a normal pattern by normalizing a keyword.

The processor 180 may generate a normalized pattern by converting each keyword into a representative keyword.

For example, the processor 180 may convert words having similar meanings into one representative word. When the keywords are "music/search" and "song/search," the processor 180 may generate the normalized pattern by converting the keyword of "song into the representative keyword "music."

In addition, the processor 180 may acquire an intention pattern matched to the normalized pattern.

The processor 180 may include an intention acquisition device 711 to acquire an intention pattern matched to the normalized pattern.

The intention acquisition device 711 may determine whether there is present an intention pattern, which is matched to the normalized pattern, in the intention pattern database to store the intention pattern, and to output an intention pattern that matches the normalized pattern.

The processor 180 may perform an operation corresponding to the intention pattern (S609).

The processor 180 may perform a preset operation corresponding to each of the intention patterns.

For example, when the intention pattern is 'weather/search', the processor 180 acquires weather information from an external server (not illustrates) through the communication interface 110, and may display the weather information on the display unit 151 of the output interface 150, or may output the weather information in the form of an audio through the sound output interface 152.

Meanwhile, when there is absent an intention pattern matched to the keyword, speech recognition may be failed. Therefore, when there is absent the intention pattern matched to the keyword, the processor 180 may retry speech recognition by processing text corresponding to a speech based on a language other than the main language.

Figure 10:
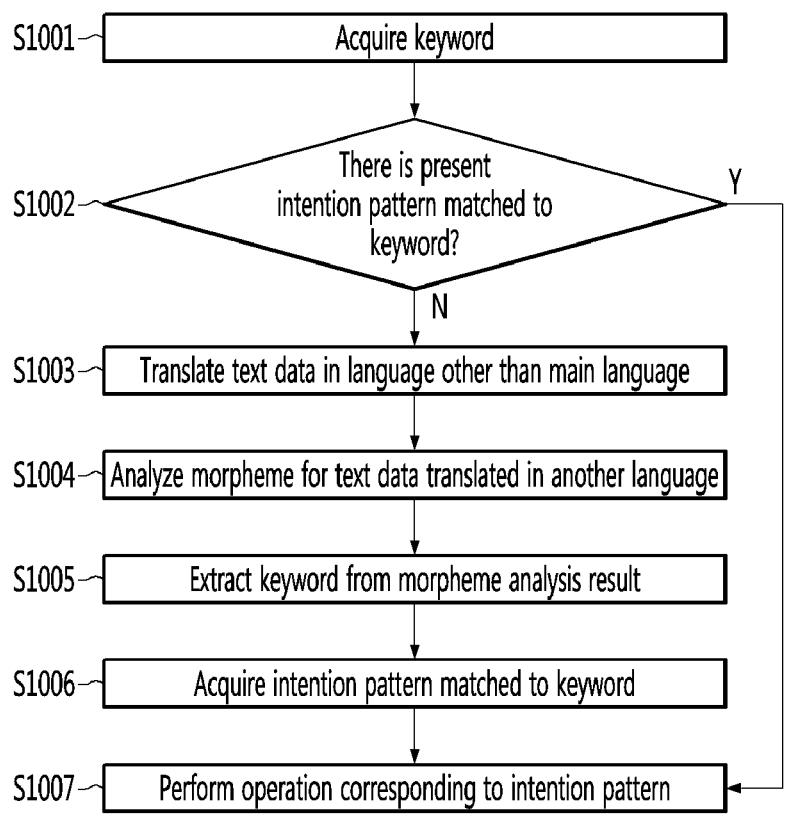
FIG. 10 is a flowchart illustrating a method for recognizing a speech according to an embodiment of the present disclosure.

FIG. 10 is a flowchart illustrating a method for recognizing a speech according to an embodiment of the present disclosure.

The processor 1800 may acquire a keyword (S1001).

The processor 180 may determine whether there is present an intention pattern matched to the keyword (S1002).

When there is present the intention pattern matched to the keyword, the processor 180 may perform an operation corresponding to the intention pattern (S1007).

When there is absent the intention pattern matched to the keyword, the processor 180 may acquire a second translated text data acquired by translating the text data in a language other than the main language (S1003).

In addition, the processor 180 may acquire a second morpheme analysis result for the second translated text data (S1004).

In addition, the processor 180 may extract a second keyword for intention analysis from the second morpheme analysis result.

In addition, the processor 180 may acquire a second intention pattern matched to a second keyword (S1006).

Accordingly, even if the processor 180 analyzes the intention for text data corresponding to a speech including Korean text data and English text data by erroneously determining the main language as Korean, the intention analysis is performed again in English instead of the main language.

The above-described disclosure is able to be implemented with computer-readable codes on a medium having a program. Computer-readable medium includes all types of recording devices having data which is readable by a computer system. For example, the computer-readable medium includes a hard disk drive (HDD), a solid state disk (SSD), a silicon disk drive (SDD), a ROM, a RAM, a CD-ROM, a magnetic tape, a floppy disk, or an optical data storage device. In addition, the computer may include the processor 180 of the server.

What is claimed is:

1. An artificial intelligence (AI) apparatus comprising:
    a microphone to acquire speech data including multiple languages; and
    a processor configured to:
    generate text data corresponding to the speech data;
    translate the generated text data to a first language of the multiple languages to obtain a first translated text data;
    generate a first morpheme analysis result based on the first translated text data;
    extract a first keyword from the first morpheme analysis result for determining an intention of the speech data;
    translate the generated text data to a second language of the multiple languages to obtain a second translated text data when no intention pattern is identified as corresponding to the first keyword;
    generating a second morpheme analysis result based on the second translated text data;
    extracting a second keyword from the second morpheme analysis result for determining the intention of the speech; and
    cause an operation to be performed when the intention pattern is identified as corresponding to the second keyword.

2. The AI apparatus of claim 1, wherein the processor is further configured to determine the first language from the multiple languages included in the generated text data based on a determination of which language is first tagged sequentially in the generated text data.

3. The AI apparatus of claim 2, wherein the first language is determined based on determining which language is tagged with a highest frequency for each character or word from among tokenized text data portions.

4. The AI apparatus of claim 2, wherein the first language is determined based on determining which language is detected a highest frequency among the multiple languages included in tokenized text data.

5. The AI apparatus of claim 1, wherein the processor is further configured to:
    translate, to the first language, portions of the generated text data that are in a language other than the first language to obtain the translated first text data; and
    translate, to the second language, portions of the generated text data that are in a language other than the second language to obtain the translated second text data.

6. The AI apparatus of claim 1, wherein the processor is further configured to determine the intention pattern including intention information extracted from various speech data.

7. The AI apparatus of claim 6, wherein the determining the intention pattern comprises generating a normalized pattern for increasing a matching possibility to the intention pattern by converting the extracted keyword into a representative keyword, wherein the intention pattern is determined based on the generated normalized pattern.

8. The AI apparatus of claim 6, wherein the second language is different from the first language.

9. The AI apparatus of claim 1, wherein the processor is further configured to:
   determine whether there is present the intention pattern matched to the extracted first keyword; and
   perform the operation corresponding to the intention pattern when there is present the intention pattern matched to the extracted first keyword.

10. The AI apparatus of claim 1, wherein the processor is further configured to translate the generated text data in the second language other than the first language to obtain the second translated text data.

* * * * *